United States Patent
Dini et al.

(10) Patent No.: US 7,472,183 B1
(45) Date of Patent: Dec. 30, 2008

(54) APPROACHES FOR CAPTURING ILLEGAL AND UNDESIRED BEHAVIOR IN NETWORK COMPONENTS AND COMPONENT INTERACTIONS

(75) Inventors: Petre Dini, San Jose, CA (US); Masum Z. Hasan, Cupertino, CA (US); Manuela I. Popescu, San Jose, CA (US); Cosmin N. Dini, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 986 days.

(21) Appl. No.: 10/637,174

(22) Filed: Aug. 7, 2003

(51) Int. Cl.
*G06F 15/16* (2006.01)
*G06F 15/173* (2006.01)
*G06F 15/177* (2006.01)

(52) U.S. Cl. .................. 709/224; 713/153; 709/202; 719/317

(58) Field of Classification Search ......... 709/200–206, 709/217–228; 719/317; 713/153
See application file for complete search history.

(56) References Cited

U.S. PATENT DOCUMENTS

| | | | | |
|---|---|---|---|---|
| 6,405,250 B1 * | 6/2002 | Lin et al. | ..................... | 709/224 |
| 6,801,532 B1 * | 10/2004 | Anandakumar et al. | ..... | 370/394 |
| 6,801,940 B1 * | 10/2004 | Moran et al. | ................ | 709/224 |
| 6,857,020 B1 * | 2/2005 | Chaar et al. | ................. | 709/226 |
| 6,868,080 B1 * | 3/2005 | Umansky et al. | ............ | 370/354 |
| 7,076,543 B1 * | 7/2006 | Kirti et al. | ................... | 709/223 |
| 7,082,463 B1 * | 7/2006 | Bradley et al. | ............... | 709/223 |

OTHER PUBLICATIONS

Network Working Group, RFC 1157 (RFC1157), entitled "A Simple Network Management Protocol (SNMP)", by J. Case, et al., dated May 1990, (pp. 1-28), http://www.faqs.org/rfcs/rfc157.html.
Network Working Group, RFC 1213 (RFC1213), entitled "Management Information Base for Network Management of TCP/IP-based internets:MIB-II", by K. McCloghrie, et al., dated Mar. 1991, (pp. 1-61), http://www.faqs.org/rfcs/rfc1213.html.
Network Working Group, RFC 1156 (RFC1156), entitled "Management Information Base for Network Management of TCP/IP-based internets", by K. McCloghrie, et al., dated May 1990, (pp. 1-71), http://www.faqs.org/rfcs/rfc1156.html.
Network Working Group, RFC 1189 (RFC1189), entitled "Common Management Information Services and Protocols for the Internet (CMOT and CMIP)", by U. Warrier, et al., dated Oct. 1990, (pp. 1-13), http://www.faqs.org/rfcs/rfc1189.html.

(Continued)

*Primary Examiner*—Haresh N Patel
(74) *Attorney, Agent, or Firm*—Hickman Palermo Truong & Becker LLP

(57) ABSTRACT

Approaches are described for capturing illegal and undesired behavior for network components and for interactions between components. One approach comprise specifying one or more states and state transitions for one or more components or interactions between components, wherein at least one composite state transition is specified, and generating a notification corresponding to a specified state or state transition when the state or state transition occurs. These approaches provide a holistic view of the entire state space of a network or component or component interactions, and allow undesired or illegal states to be captured in a timely manner.

47 Claims, 7 Drawing Sheets

OTHER PUBLICATIONS

Cisco Systems, Inc., entitled, "Cisco CNS Notification Engine SNMP Support Guide", #OL-3057-03, dated Jul. 29, 2003, (18 pgs).

Cisco Systems, Inc., entitled, "Cisco CNS Notification Engine SNMP Support Guide for Release 3.0", #OL-3057-03, dated Mar. 20, 2003, (9 pgs).

Cisco Systems, Inc., entitled, "Cisco IOS Software Releases 12.0 S, SNMP Support for VPNs", dated Mar. 6, 2003, (pp. 1-13).

Cisco Systems, Inc., entitled, "Cisco IOS Software Releases 12.0S, SNMP Notification Logging", Jan. 30, 2003, (pp. 1-8).

TSG-RAN Working Group 2 (Radio layer 2 and Radio layer 3), Stockholm 8th to 11th, entitled, "RLC Protocol States", source Ericsson, dated Mar. 1999, (3 pgs).

Cisco Systems, Inc., entitled, "Cisco CNS Notification Engine, Introduction to SNMP", dated Oct. 23, 2003, (pp. 1-4).

* cited by examiner

APPROACHES FOR CAPTURING ILLEGAL AND UNDESIRED BEHAVIOR IN NETWORK COMPONENTS AND COMPONENT INTERACTIONS

FIELD OF THE INVENTION

The invention generally relates to management of communication networks. The invention relates more specifically to approaches for capturing illegal and undesired behavior for network components and for interactions between components.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Various approaches currently exist for monitoring the condition of network components. Some approaches monitor Management Information Base (MIB) objects. A MIB object is a variable whose value indicates a condition of a network component. The value of the MIB object may trigger a notification (e.g., special event) when a threshold that indicates a status or condition of the component is crossed by that value. One or more MIB objects (e.g., object status) may be associated with each component of a network. For example, there may be a MIB object associated with a CPU. The value of the CPU MIB object describes the state of the CPU (e.g., active or inactive). The value of a MIB object may be changed or retrieved using network management protocol commands, such as Simple Network Management Protocol (SNMP) commands or Common Management Information Protocol (CMIP) commands.

Based on the values of the MIB objects of network components, network management systems for applications using the SNMP and CMIP management protocols may monitor the status of network components. The values of MIB objects may be polled by such systems or applications using SNMP or CMIP, or traps or notifications, respectively, may be sent by components to the managing applications using SNMP, CMIP, or other transport supports. However, the current approaches have several shortcomings. Namely, the thresholding techniques that are used to define states in the systems or applications do not present a complete picture of network behavior. More specifically, the quantity of values of MIB objects that is available to the management system or application may be insufficient to paint a complete picture of the network behavior. Additionally, techniques for monitoring values of MIB objects such as polling do not allow the value of the MIB object to be received by system management protocols in a timely fashion.

Current threshold concepts, which are used to classify MIB values, focus on known states of a network component and transitions, but do not consider composite transitions among multiple states. Additionally, current threshold concepts are used to capture desirable behavior, and are not directed toward capturing illegal or undesirable behavior. Therefore, current approaches do not consider the behavior of an entire component or sub-networks. Due to the foregoing shortcomings, network management applications are unaware of certain network problems, or learn about problems too late. As a result, systems or applications that use them are unable to rectify certain global problems in communication networks.

Classically, thresholds have been established based on a status variable, a comparison, and an optional condition string for a particular probe variable. If the comparison triggers, that is if the expression comparing the probe variable to a constant or other variable is true, then the device is changed to the corresponding status. State variables, which are also sometimes referred to as "attributes", may belong to continuous spaces, such as time intervals, or discrete spaces, such as numerical or alphanumerical sets. Among the values of a given space, one can define many thresholds. However, these approaches for using thresholds have numerous disadvantages. For example, as mentioned above, these approaches do not consider composite transitions, and, therefore, do not consider the entire behavior of a component or a network.

Based on the foregoing, there is a clear need for a means of capturing illegal and undesirable network behavior in a manner that avoids the aforementioned problems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
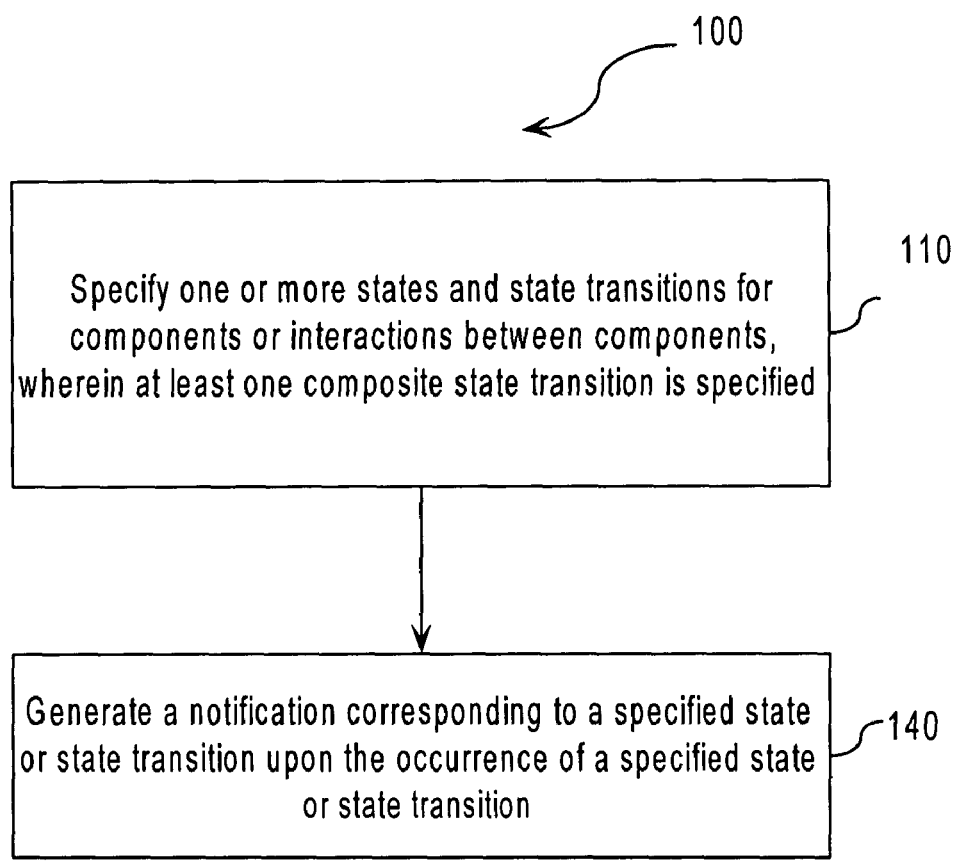
FIG. 1 is a flow chart depicting an embodiment of a method for capturing illegal and undesired network behavior.

Approaches are described for capturing illegal and undesired behavior for network components and for interactions between components. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Example Implementations
4.0 Implementation Mechanisms-Hardware Overview
5.0 Extensions and Alternatives

1.0 GENERAL OVERVIEW

The needs identified in the foregoing Background, and other needs and objects that will become apparent for the following description, are achieved in the present invention, which comprises, in one aspect, a method for capturing illegal and undesired behavior for network components and for interactions between components, the method comprising specifying one or more states and state transitions for one or more components or interactions between components, wherein at least one composite state transition is specified, and generating a notification corresponding to a specified state or state transition when the specified state or state transition occurs.

Approaches for defining state expressions for use in capturing illegal and undesired behavior for network components and component interactions are also disclosed. These approaches, in an embodiment, comprise specifying states and state transitions relating to components and component interactions in a network, wherein at least one composite state transition is specified.

There are many applications in which the disclosed approaches are useful. In particular, the disclosed approaches provide a means for informing a network management system in a timely manner about illegal and undesired behavior in network components and interactions between network components. In such an application, the states represent network element states, and transitions are actions or changes by the network elements. Because the network management system is informed about the illegal or undesirable behavior in a timely manner, measures may be implemented to handle or rectify such illegal and undesired behavior in a timely manner. Additionally, the network management system is provided with more information about the network as a whole, which improves the ability of the network management system to accurately analyze the state of the network and determine the best means of handling any illegal or undesired behavior.

The disclosed approaches are also useful in many other applications. For example, the disclosed approaches may be used to specify complex filters for capturing not only desired behavioral variations, but also undesired or illegal behavior at the component or system level. In this regard, the types of threshold-notifications that are disclosed may be combined with classical threshold mechanisms to create qualitatively complex filters.

The approaches disclosed herein are also useful in intrusion detection and reduce the amount of network observations that must be made by network analysts. The methods can be used to specify classes for unauthorized Internet use (e.g., illegal, or undesired). Using such classes, measures may be implemented for monitoring and handling illegal or undesirable Internet use.

The disclosed approaches may also be used in monitoring network behavioral deviations. For example, custom alarm views may be created and used to define advanced performance collection, or monitoring a service level agreement (SLA). In an embodiment, an illegal state corresponds to an authorization violation or authentication forgery, while an undesired state designates SLA violations or Quality of Service (QoS) degradations (in the latter case, a frequent QoS class change may lead to system instability, or to QoS management systems which are not scalable).

The disclosed approaches are also useful for dealing with geographical distribution of minutiae for biometric authentication. In this regard, the methods may be used to define customizable thresholds for biometric authentication. An embodiment may represent different geographical areas as states and apply transitions to keep the level of false acceptance rate and false rejection rates at acceptable levels.

Other uses for the disclosed methods include uses in monitoring multiprotocol label switching (MPLS) control plane and data plane correlations, and uses in defining new mechanisms for testing hardware and software systems.

In other aspects, the invention encompasses a computer apparatus and a computer-readable medium configured to carry out the foregoing steps.

2.0 STRUCTURAL AND FUNCTIONAL OVERVIEW

FIG. 1 is flow chart depicting an embodiment of method 100 for capturing illegal and undesired behavior in network components and component interactions.

Step 110 of method 100 comprises specifying one or more states and state transitions for components or interactions between two or more components, wherein at least one composite state transition is specified. In one embodiment, the states and state transitions are defined or coded into a network management application.

Step 120 includes generating a notification corresponding to a specified set of states or set of state transitions if the specified states or state transitions occur. A notification may comprise a trap, an event, writing to a log file, or any type of inter-component communication or messaging. A state of a component or state of an interaction between components indicates a condition of the component or interaction. For example, in respect of a network router, switch, or CPU, states may include "idle," "active" or other states that may be defined. A state transition is a transition from a first state to a second state. For example, in the context of a CPU, a state transition may be a transition from the state of "idle" to the state of "active." Heretofore, approaches for monitoring the condition of network components have been limited to considering individual states and state transitions. In addition to states, the approaches disclosed herein also consider composite state transitions. A composite state transition is defined as including multiple state transitions. For example, in respect of a CPU, a composite state transition may include transitions from the "idle" state to the "active" state, and from the "active" state to the "busy" state, concurrently or in combination.

States can be defined by the establishment of thresholds. The thresholds demarcate various states. A threshold is a value for one or more state variables that reflects a condition in one or more network components or a condition in one or more interactions between network components. A threshold is satisfied if a state variable meets or crosses the threshold. In one embodiment, there are at least two types of new thresholds: (1) state-based thresholds; and (2) transition-based thresholds. A state-based threshold is a type of threshold satisfied when a component state becomes either illegal or undesired. A transition-based threshold is a type of threshold satisfied by a transition from a legal state to an illegal or undesirable state.

The value spaces in which thresholds are defined may be continuous spaces (e.g., time intervals) or discrete spaces (e.g., numerical or alphanumerical sets). Among the numerical values of a given space, one can define many thresholds. When the threshold is satisfied (e.g., crossed over) an event is generated. Among the values of a given space, many thresholds may be defined; for example, every time the variable value crosses a given threshold two different events are issued, (i) an information event such as a notification alert to a monitoring or management system, e.g., an inform in SNMPv3, and (ii) a behavioral event, internal to the component, eventually modifying the status of the component or system. While the first is processed in accordance with specified rules for handling the particular alert, the second may simply represent a new functional state or operational mode, a degradation of the service offered by that component, or an unknown, illegal, or undesirable state. Threshold-based events may be produced by any device of a network, protocols, user applications, and management applications. Threshold events can be generated by a state, performance, or accounting notification, or via initiated polling.

Figure 2:
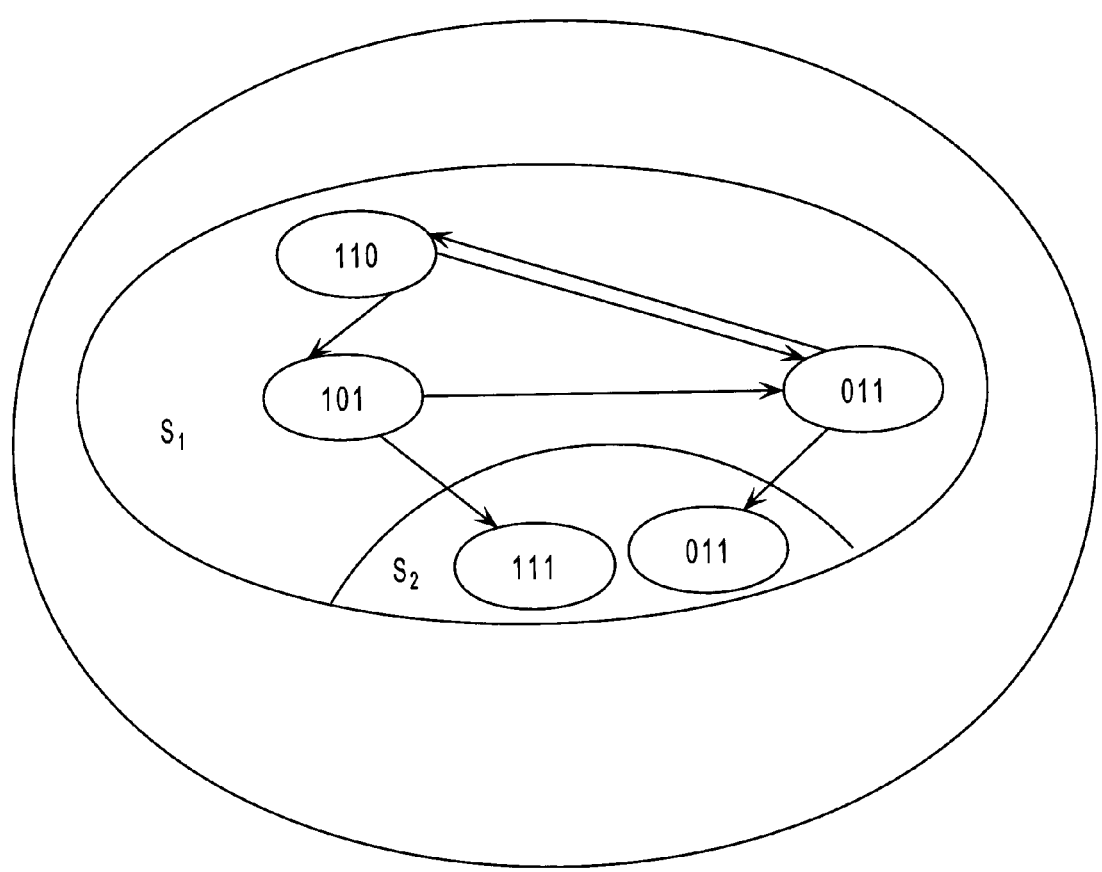
FIG. 2 is a state diagram depicting a number of states specified according to the method described in FIG. 1.

FIG. 2 is a state diagram depicting a number of states specified according to step 110.2

Threshold conditions may be defined for network components or interactions between network components. For example, as shown in FIG. 2, sub-space $S_1$ includes states 110, 101 and 011, which are defined as desired states. The various states relate to a condition of a component. For example, if the component is a CPU, state 110 may correspond to an idle state, state 101 may correspond to an almost busy state, and state 011 may correspond to an active state. These states may be defined as desirable states. Sub-space $S_2$, which encompasses illegal or undesired states, includes state 111 and state 011. State 111 may correspond to a busy state, which may be defined as an undesired state. State 011 may correspond to an overloaded state, which may be defined as an illegal state. When the state of a component enters the sub-space $S_2$, an event is generated, thus signaling the occurrence of an illegal or undesired state to a management system or application.

The event, as well as information regarding various aspects of the event (e.g., the cause of the event), may be reported to the network management system. Based on the information regarding that the event that the network management system receives, the network management system may implement measures to rectify or handle the occurrence of the undesired or illegal state. Additionally, in embodiments, based on meta-data regarding states and state transitions that is stored in the network management systems, the network management system may implement measures to rectify or handle the occurrence of the undesired or illegal state.

Figure 3:
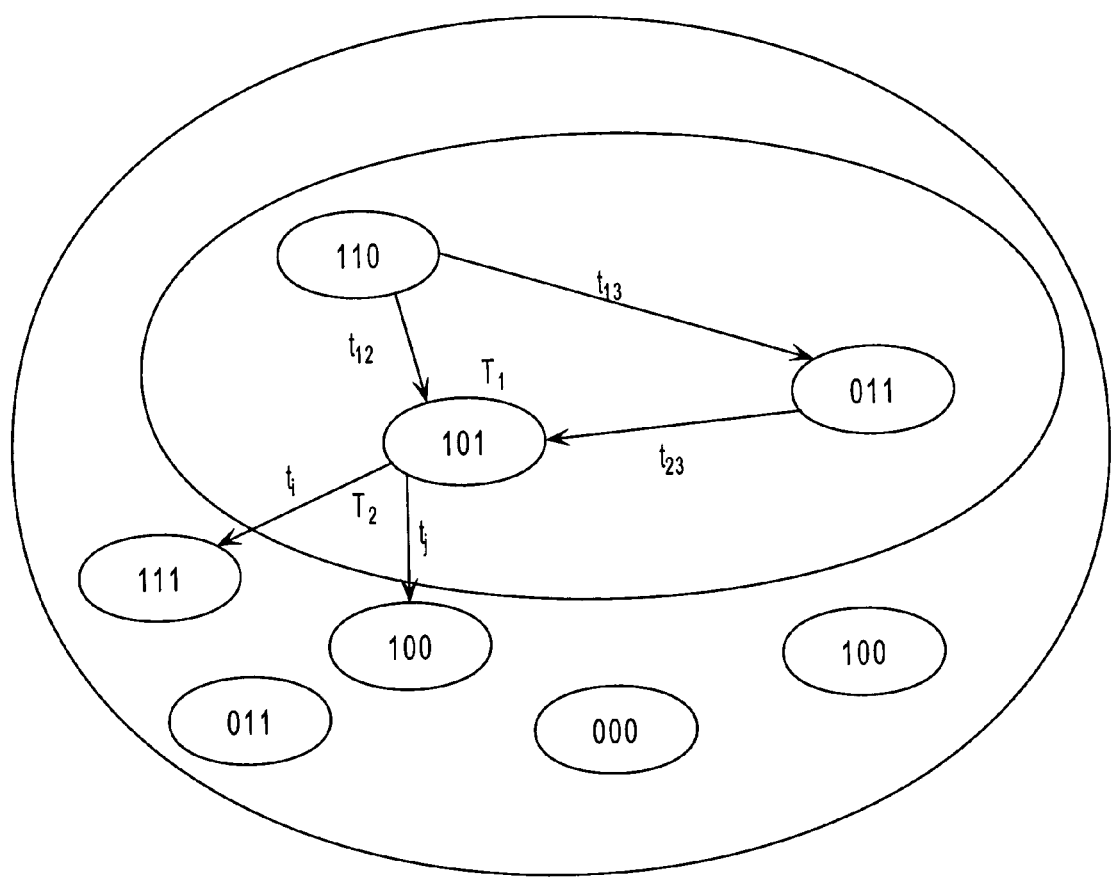
FIG. 3 is a state diagram depicting a number of transitions specified according to the method depicted in FIG. 2.

FIG. 3 is a state diagram depicting a number of transitions specified according to method 100.

Threshold conditions may be defined for transitions between states of network components or interactions between network components. For example, as shown in FIG. 3, sub-space $T_1$ may include transitions $t_{12}$, $t_{13}$ and $t_{23}$. Transition $t_{12}$ corresponds to a transition between state 110 and state 101, transition $t_{13}$ corresponds to a transition between state 110 and 011, and transition $t_{23}$ corresponds to a transition between state 011 and 101. State $t_{12}$, $t_{13}$ and $t_{23}$ are defined as desirable transitions. The various transitions in FIG. 3 correspond to example transitions between conditions of a component or between the condition concerning component interactions. For example, if the component is a CPU, state 110 may correspond to an idle state, state 101 may correspond to an almost busy state, and state 011 may correspond to an active state. Therefore, transition $t_{12}$ corresponds to a transition from idle state 110 to almost busy state 101. Transition $t_{13}$ corresponds to a transition from idle state 110 to active state 011. Transition $t_{23}$ corresponds to a transition from active state 011 to almost busy state 101. These transitions may be defined as desirable transitions. When a desirable transition occurs, no event is generated to alert the management system.

Sub-space $T_2$, which encompasses illegal or undesired transitions, includes transitions $t_i$ and $t_j$. Transition $t_i$ represents a transition from almost busy state 101 to busy state 111. Transition $t_i$ is defined as an undesirable transition, in an embodiment. Transition $t_j$ corresponds to a transition from almost busy state 101 to illegal state 100. Transition $t_j$ is defined, in an embodiment, as an illegal transition. When a transition falls under sub-space $T_2$, an event following this disclosed schema is generated.

An event regarding illegal or undesired transitions, as well as information regarding various aspects of the event (e.g., the cause of the event), may be reported to the network management system. Based on the information regarding that the event that the network management system receives, the network management system may implement measures to rectify or handle the occurrence of the undesired or illegal state transition. Additionally, in embodiments, based on meta-data regarding states and state transitions that is stored in the network management systems, the network management system may implement measures to rectify or handle the occurrence of the undesired or illegal state transition.

Threshold conditions may also reflect composite state transitions involving states of network components or interactions between network components. For example, state transitions $t_{23}$ and $t_j$ could be considered a composite transition, as could transition $t_{12}$ and $t_{23}$. In one embodiment, a state machine characterizes certain composite state transitions as desirable, undesirable, or illegal. The state machine is implemented programmatically in a network management protocol, application or system. When an undesirable or illegal composite state transition occurs, an event is generated and may be reported to a network management system. States can also be specified that relate to combinations of states and state transitions.

The states and state transitions that are specified may be stored using various arrangements. For example, states and state transitions may be stored in an event log. The event table may be stored at various network levels. For example, the event log may be stored in a network component, or may be stored at the network management level. The event log may also be stored in an agent that detects the occurrence of states and state transitions. If there is an occurrence, the agent may generate an event.

Various mechanisms may be used to determine whether a threshold is triggered. These include the use of an agent, such as a dedicated agent. The agent is configured to recognize the triggering of thresholds and/or the generation of events. In other embodiments, the network management system polls components to determine whether thresholds are crossed, and an appropriate event must be triggered.

Figure 4:
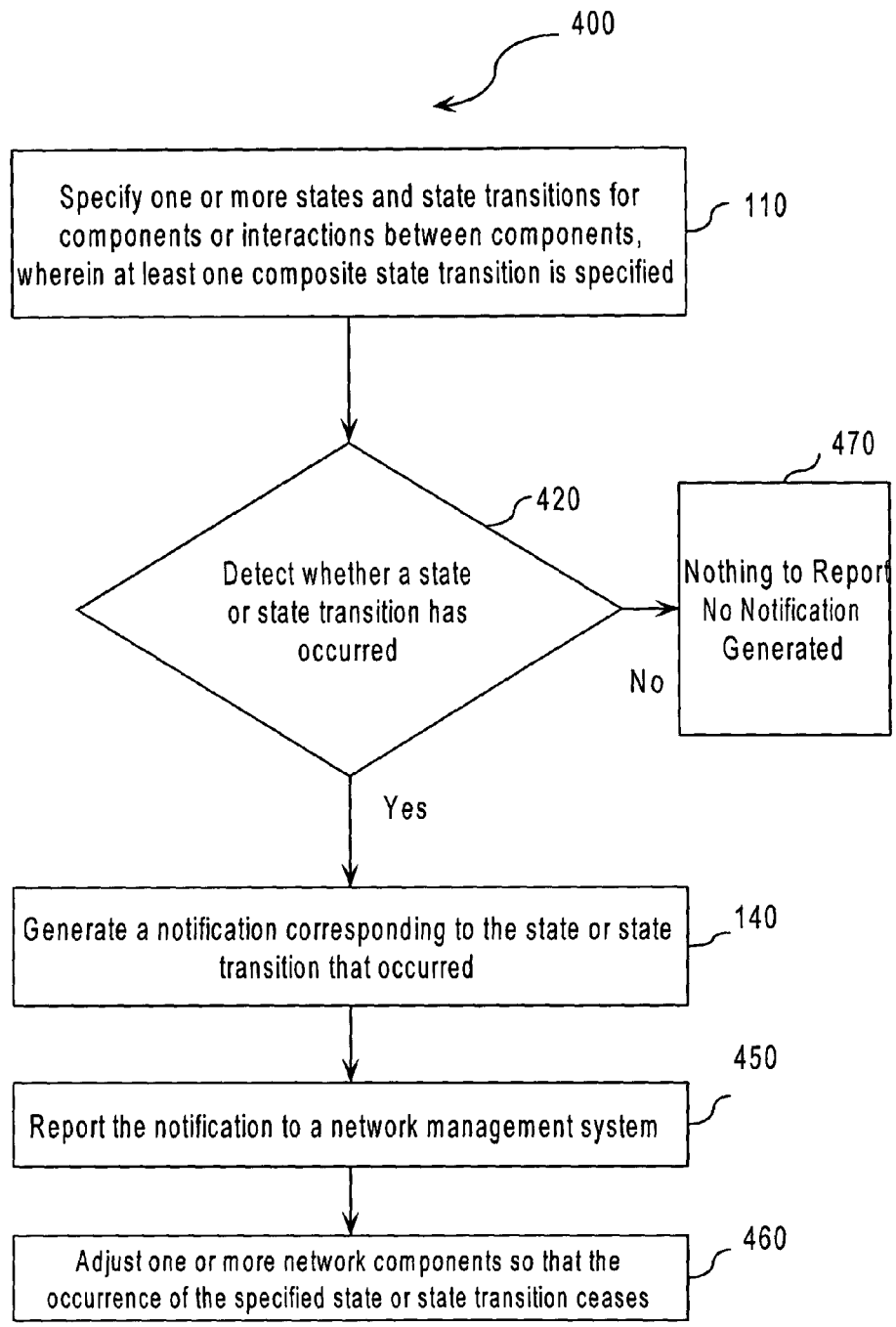
FIG. 4 is a flow chart depicting an embodiment of a method for capturing illegal and undesired network behavior.

FIG. 4 is a flow chart depicting an embodiment of method 400 for capturing illegal and undesired behavior in network components and component interactions. Method 400 includes the steps of method 100, as well as a number of additional steps. Step 420 includes detecting whether a state has been reached or a state transition has occurred.

The detection of whether a state has been reached and whether a state transition has occurred may be implemented in various manners. In one example, an agent, such as a dedicated agent, performs this function. In one embodiment, the agent performs this function by examining components and component interactions. In another embodiment, components report the occurrence of states and state transitions to the agent.

If a state or state transition is detected in step 420, a notification, such as an event, is generated in step 140. Step 450 includes reporting the notification to the network management system. In an embodiment, the agent is configured to report the occurrence of events to a network management system. Therefore, step 450 may be performed by the agent.

After a notification is reported to the network management system in step 450, based on the event, the network management system may adjust one or more components so that the occurrence of the specified state or state transition ceases or does not reoccur. In other embodiments, the notification may be reported to a user, and the user may take action to cause the occurrence of the specified state or state transition to cease.

As described in step 470, if no notification is generated, no notification is reported.

Figure 5:
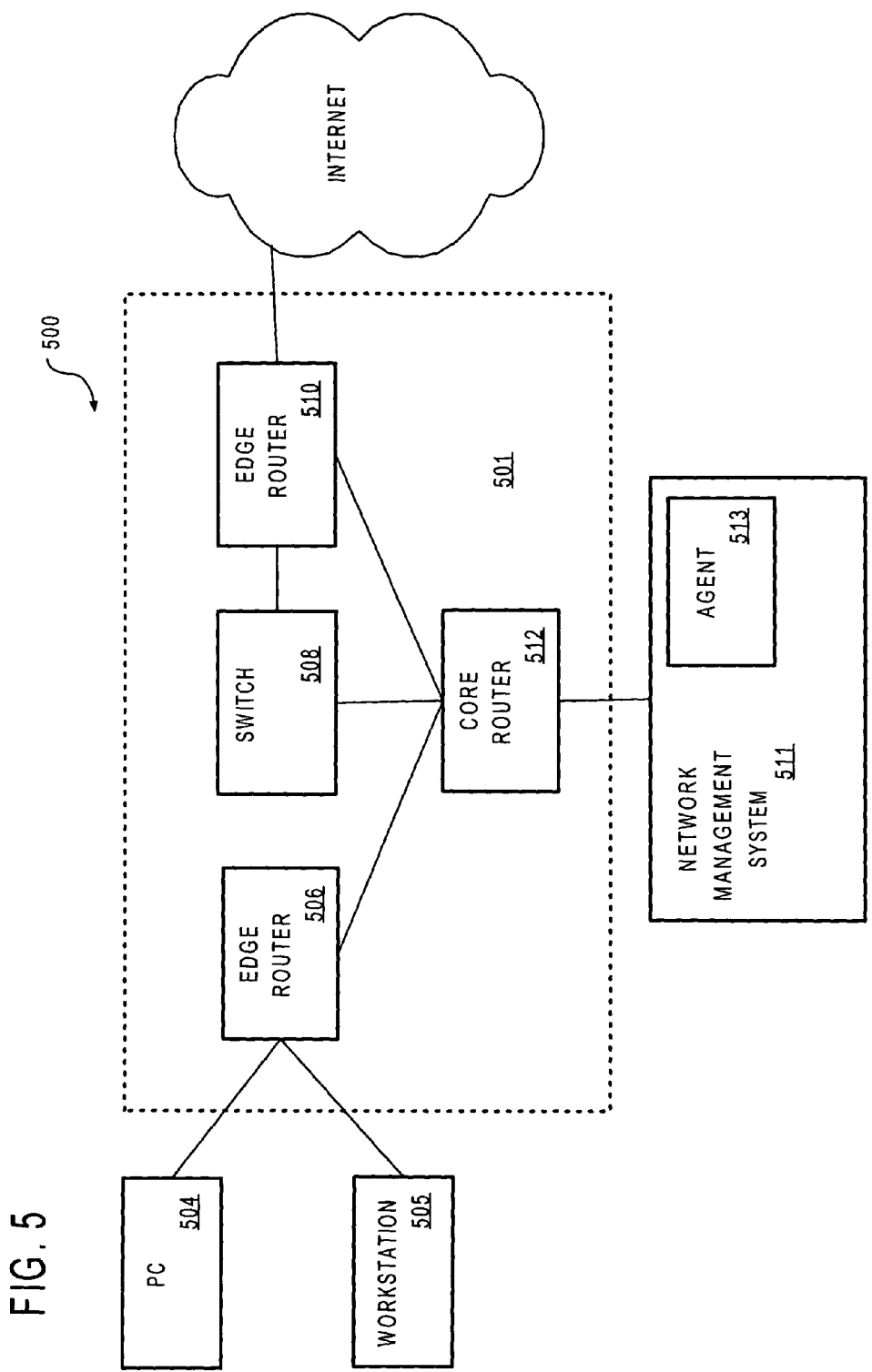
FIG. 5 is a block diagram of an embodiment of a system for capturing illegal and undesired network behavior.

FIG. 5 is a block diagram of an embodiment of system 500 for implementing an embodiment of an approach for capturing illegal and undesired behavior in network components and component interactions. In the approach, state transitions are specified for one or more components or interactions between components, wherein at least one composite state transition is specified. Events corresponding to a specified state or state transition are generated when the specified state or state transition occurs.

System 500 may be part of a larger network or system, such as the system described below in FIG. 7. System 500 includes network components 501. Network components 501 may comprise any type of components that are used in a communication network. In the embodiment shown, network components 501 include edge router 506, switch 508, edge router 510 and core router 512. Edge router 506 may be connected to various devices, such as, in an embodiment, PC 504 or workstation 505. Edge router 510 may be connected to the Internet. Switch 508 may be located between edge router 510 and core router 512.

Various thresholds may be established to indicate desirable, undesirable and/or illegal states for each of network components 501. For example, for edge router 510, "idle" and "active" may be specified as desirable states, while "busy" may be specified as an undesirable state. "Overload" may be specified as an illegal state. States may also be specified in respect of interactions between the various network components 501. State transitions, including composite state transitions, may also be specified for individual network components 501, for combinations of network components 501, and for interactions between components 501.

Network management system 511 is connected to network components 501, and, in an embodiment, is directly connected to core router 512. Network management system 511 may communicate with components 501 using any of various management protocols, such as SNMP or CMIP. When network management system 511 learns about events indicating the presence of undesired or illegal states in network components 501 or in interactions between network components 501, network management system 511 may implement measures to rectify or handle the relevant components or interactions. Such measures may include adjusting network components 501, or altering the interactions between network components 501.

When a specified state or state transition occurs, an event is generated. In an embodiment, events are spontaneously generated by individual network components 511 upon the occurrence of a specified state or state transition. In such an embodiment, the individual network components 511 themselves are configured to detect whether thresholds relating to their own condition or interactions with other network components 511 have been satisfied. The individual network components 511 have access a state table that enables the individual network component 511 to determine their own state based on triggered thresholds. In such an embodiment, agent 513 is configured to detect events that have been generated by individual network components 501.

In another embodiment, agent 513 examines network components 511 and interactions between network components 511, and, if agent 513 determines that a specified state or state transition has occurred, agent 513 generates the event. In such an embodiment, agent 513 comprises, or has the capability of accessing, a state table in which various states and state transitions are specified.

Agent 513 is configured to report events to network management system 511. In an embodiment, agent 513 is in network management system 511. As mentioned above, after network management system 511 becomes aware that a specified state has been reached or specified transition has occurred, network management system 511 may implement measures to handle the state or transition that occurred. To determine appropriate measures, network management system 511 contains a table of measures that are to be implemented upon the occurrence of specified states and transitions.

Figure 6:
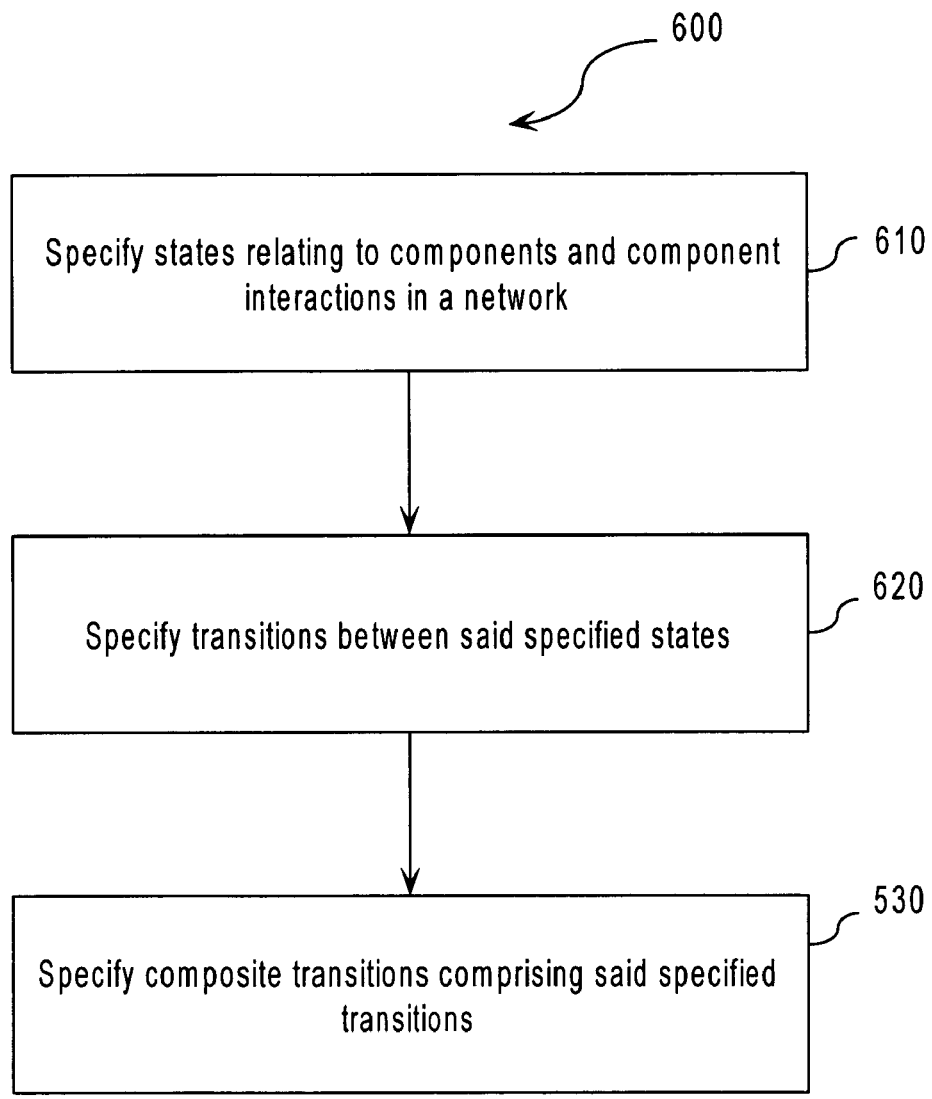
FIG. 6 is a flow chart depicting an embodiment of a method for defining a state table of illegal and undesirable states and state transitions.

FIG. 6 is a flow chart depicting an embodiment of method 500 for defining a state table for use in capturing illegal and undesired behavior for network components and component interactions. The method, in an embodiment, comprises specifying states and state transitions, including at least one composite state transition, relating to components and component interactions in a network.

Method 600 includes step 610. In step 610, states relating to components and component interactions may be specified. States may be identified as desirable, undesirable or illegal. Other states may also be identified.

In step 620, transitions between the steps specified in step 610 are specified. Similar to the definition of states as described in step 610, transitions may also be identified as desirable, undesirable, illegal or may be identified otherwise.

Step 630 includes specifying composite transitions which comprise the transitions specified in step 620. Similar to step 620, composite transitions may also be identified as desirable, undesirable, illegal or otherwise.

A state table that is created according to method 600 may be stored in agent 513. In embodiments, a copy of the state table may be stored in network management system 511, or in accessible memory locations. In an embodiment, a state table or a portion thereof may be stored in a network component 501.

3.0 EXAMPLE IMPLEMENTATIONS

The disclosed approaches may are useful for applications in various other domains, as described below.

3.1 Design of Global Behavior Filters

In another application, the disclosed approaches may be used to create global behavior filters for networks. Filters are mechanisms that select events, and can be used in conflict detection for issuing appropriate notifications. Filters can be adapted to various types of thresholds and act upon specific metrics or values of MIB objects. Filters may capture not only desired behavioral variations, but also undesired or illegal behavior that is expressed in a complementary way at the component or system level. The types of threshold-notifications that are disclosed herein may be combined with classical threshold mechanisms to create qualitatively complex filters.

3.2 Intrusion Detection 3.2.1 Preventing Limits of Observations

IN an application, the approaches herein provide a mechanism to detect unauthorized "back door" connections into a network. Undesired and illegal states can be specified to represent unauthorized connections. Using prior art approaches, such unauthorized connections may not be detected because network sensors may not function as intended, bandwidth limits may be exceeded, or because an intrusion detection system does not have the capability to look at every possible event. The disclosed approaches can overcome these issues.

In some cases, in prior art approaches, network analysts may evaluate an intrusion attempt and decide it isn't worth investigating. However, using the disclosed approaches, special thresholds may be implemented to capture classes of such problems and therefore allow the notification of any existing patterns, so that the severity and relevance of particular events may be more thoroughly considered by network management systems or network analysts.

3.2.2 Unauthorized Internet Use

In general, special filters for detecting illegal or unauthorized Internet use may be implemented using the disclosed mechanisms. One may consider a set of strings (or XML tags), and define a special feedback application that is performed when intrusion detection is perceived, with various degrees, expressed as intrusion classes. The class of use than may be defined as undesired may be the item set of time spent by a user on a particular web site, while the class of illegal classes may be defined as keywords associated with prohibited web contents. The disclosed approaches may help not only in detecting intentional use, but may also be used to detect accidental access of illegal or undesired sites. A network management system may analyze the resulting patterns of illegal or undesired behavior by users.

3.2.3 Unauthorized VPN Service Use

The disclosed approaches also may be used to provide a solution for classifying various degrees of unauthorized use of Virtual Private Network (VPN) services and detect classes of users that intentionally or unintentionally violate permitted uses.

3.3 Protocol Design

Protocols are state based. For example, in respect of an item, suppose that there are the following potential values of protocol state values.

Requester States: IDLE, PENDING, NOT-SUPPLIED, CONDITIONAL, CANCEL-PENDING, CANCELLED, SHIPPED, RECEIVED, RENEW/OVERDUE, OVERDUE, NOT-RECEIVED/OVERDUE, RECALL, RETURNED, LOST Responder States: IDLE, IN-PROCESS, FORWARD, NOT-SUPPLIED, CONDITIONAL, CANCEL-PENDING, CANCELLED, SHIPPED, RENEW-PENDING, RENEW/OVERDUE, OVERDUE, RECALL, CHECKED-IN, LOST Protocol Variables: RETURN flag, FWD flag, PART flag, CHAIN flag, SEQUENCE-TIME-STAMP, REPEAT-TIME-STAMP, CURRENT-PARTNER-ID, PREVIOUS-PARTNER-ID History Information
(i) Date of last transition
(ii) Most recent service
(iii) Date of most recent service
(iv) Initiator of most recent service
(v) Shipped service type*
(v) Transaction results*
(vi) Most recent service note
(vii) History may not be available if terminal state reached In a guaranteed environment, {NOT-RECEIVED, LOST} may be considered illegal states, while {CANCEL-PENDING, CANCELLED, LOST} may be considered undesired states. Defining threshold for these sets of states may help a Service Level Agreement (SLA) system to capture an SLA violation.

Accordingly, any transition to the above sub-sets can be captured and sent to a management system. A pattern indication may contain other variables as expressed in history information or protocol variables.

3.4 Monitoring Network Behavioral Deviations 3.4.1 Creation Custom Alarm Views

The disclosed approaches for specifying states and state transitions may be used to create "custom views" of a network. Custom views provide a tool by which a user may easily find or filter out required output in the screen from special types of alarm data. In one embodiment, a custom view is a set of objects or data, which are subsets of a complete set of data or objects, satisfying a given criteria. Custom views may be used to specify the states in which specific network conditions may be viewed. Custom views may be used to aggregate state and transitions for object interactions.

3.4.2 Advanced Performance Collection

The disclosed approaches for capturing illegal and undesired network behavior may also be used to implement performance collectors. Performance collectors collect a particular set of data related to the performance of a given service, user, or set of variables. As availability is one of the global parameter on a system or component, the new types of thresholds can be used to define global metrics on component or network behavior. For example, an application can define undesired states or illegal states relating to one or more aspects of the performance of components, portions of the network, or the network as a whole.

3.4.3 Monitoring Service Level Agreements

The disclosed approaches are also useful in the monitoring of SLA implementation. An SLA is a common agreement between two entities regarding the use of a network. An SLA may include a provision regarding the amount of services to be provided by a service provider, and the amount of services to be used by a user. Commonly, a service provider applies either penalties or credits when the quality or amount of service used varies from the quality or amount provided for in the SLA. An SLA may be implemented or monitored by using a state machine defining various classes of QoS and appropriate SLA transitions.

3.5 Biometric Authentication

Most fingerprint identification systems use fixed acceptance thresholds for authentication. A threshold depends on the algorithm selected for the system. The algorithm will determine, according to the matching technique employed, the acceptable value that should be assigned to the threshold. The selection of the threshold also influences the False Acceptance Rate (FAR) and the False Rejection Rate (FRR). If it is strict (high value required for the matching score), as strong authentication is required, the risk that an impostor will be accepted is low (the FAR decreases), but the improper rejection of a genuine user is more likely to happen (the FRR increases). On the other hand, if the threshold is chosen in a "lax" way, the effects on the acceptance and rejection rates are inverted.

In general, there is one threshold set for each system, regardless of the external conditions of the testing, the inner characteristics of the fingerprints or the application's nature. This can introduce high error rates, with respect to either acceptance or rejection, because of the application is non-flexibility. In an effort to narrow the FRR, the goal of "adaptable parameters" is to make the authentication system as flexible as possible, without weakening it (by maintaining the FAR as low as possible). A key condition to biometrics success is its wide acceptance by the public, but, a system with a high FRR is particularly inconvenient for the users. If, instead of coercing the users in enduring such a drawback, the system's parameters could be adapted to the users or the other elements, then it would dramatically improve the authentication results. This is feasible by taking into consideration all or some of the conditions described above.

The disclosed approaches can help to define customizable biometric thresholds. An appropriate algorithm may consider different geographical areas as states and apply transitions to keep the level of FAR and FRR under authentication usefulness. Particular fingerprint areas may be specified as undesired because they contain less minutiae, or as undesirable with respect to the technology. For example, given the technology, results may be inaccurate if large areas are captured, or results may be inaccurate for a particular class of individuals whose minutiae distribution is specifically different.

3.6 Other Uses 3.6.1 MPLS Control-Plane and Data-Plane Correlations

These disclosed approaches enable the establishment of special correlations and conflict detection between tunnel states when considering data-plan and control-plan together. A set of states in the data-plan can be mapped to another set of states in the control-plane. Any other combination can be defined as either illegal or undesirable.

3.6.2 Testing Methodologies for Hardware and Software Systems

The disclosed methods may be used to define system-wide test suite cases focusing first on illegal and undesired transitions, then on conformance testing for each state variable.

Other uses include uses in Command Line Interface (CLI) parsing and Link State Advertisement (LSA) synchronization in Open Shortest Path First (OSPF) routing environments.

4.0 IMPLEMENTATION MECHANISMS

Hardware Overview

Figure 7:
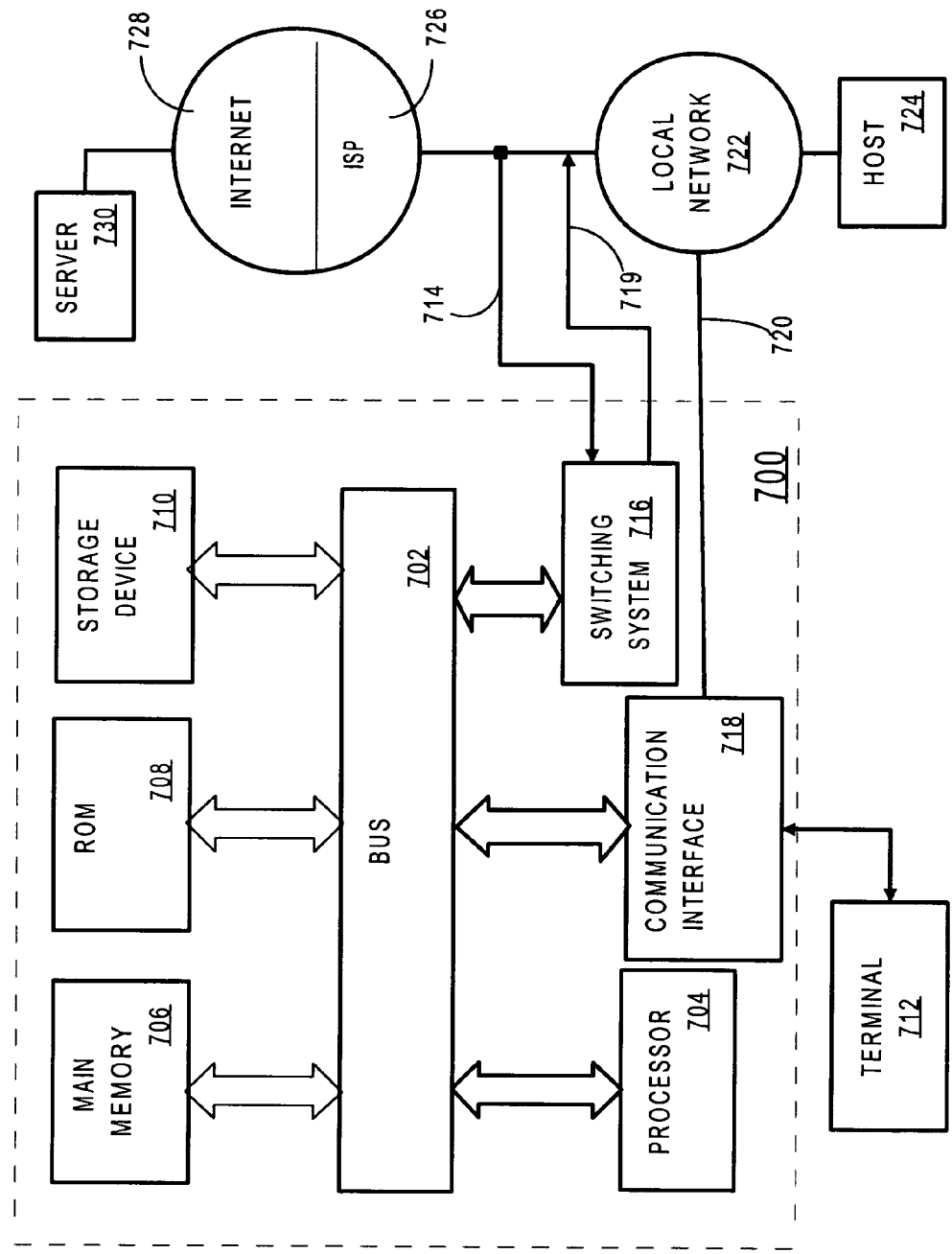
FIG. 7 is a block diagram that illustrates a computer system upon which an embodiment may be implemented.

FIG. 7 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 714. Firmware or software running in the computer system 700 provides a terminal interface or character-based command interface so that external commands can be given to the computer system A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Internet 728.

The invention is related to the use of computer system 700 for capturing illegal and undesired behavior in network components and component interactions. According to one embodiment of the invention, approaches for capturing illegal and undesired behavior in network components and component interactions are provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for capturing illegal and undesired behavior in network components and component interactions as described herein.

The received code may be executed by processor 704 as it is received, and/or stored in storage device 710, or other non-volatile storage for later execution. In this manner, computer system 700 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for capturing behavior for network components and for interactions between components comprising:
   accessing first data that defines one or more states and state transitions for a particular component or interaction between a particular two or more components,
      wherein the first data defines at least one composite state transition, each of said composite state transition comprising multiple state transitions;
   accessing second data that indicates, for the particular component or interaction between the particular two or more components, a set of one or more undesirable states or state transitions;
      wherein each of said one or more undesirable states or state transitions is a state or state transition of the one or more states and state transitions that is associated with undesirable behavior;
   accessing third data that indicates, for the particular component or interaction between the particular two or more components, a set of one or more illegal states or state transitions;
      wherein each of said one or more illegal states or state transitions is a state or state transition of the one or more states and state transitions that is associated with illegal behavior;
      wherein the set of one or more illegal states or state transitions is different from the set of one or more undesirable states or state transitions; and
   in response to the particular component or interaction between the particular two or more components entering a particular state or state transition, generating a notification corresponding to the particular state or state transition,
      wherein the particular state or state transition is one of the one or more states and state transitions;
      wherein the particular state or state transition belongs to either the set of one or more undesirable states or state transitions or the set of one or more illegal states or state transitions;
   the method further comprising:
      detecting that the particular component or interaction between the particular two or more components has entered the particular state or state transition;
   wherein said notification is generated in response to said step of detecting;
   wherein the step of detecting comprises:
      monitoring a condition associated with the particular component or interaction between the two or more particular components;
      querying a state table storing said first data to determine a state for the particular component or interaction between the two or more particular components;
      determining, based on the second data and third data, that the determined state belongs to either the set of one or more undesirable states or state transitions or the set of one or more illegal states or state transitions.

2. The method recited in claim 1, wherein the first data is stored in a state table in a network management system, wherein the step of generating is performed by a component or agent separate from the network management system.

3. The method recited in claim 1, wherein the first data is stored in a state table in the particular component or in at least one of the two or more particular components.

4. The method recited in claim 1, wherein the one or more states are specified based on thresholds.

5. The method recited in claim 1, wherein the notification is an event.

6. The method recited in claim 1, wherein the particular component or interaction between the particular two or more components is a component, and wherein the step of generating the notification comprises generating the notification by the component.

7. The method recited in claim 1, wherein the particular component or interaction between the particular two or more components is an interaction between the particular two or more components, and wherein the notification is generated by at least one of the particular two or more components.

8. The method recited in claim 1, further comprising the step of:
reporting the notification to a network management system.

9. The method recited in claim 1, wherein, the step of detecting is performed by an agent, said agent being different than the particular component.

10. The method recited in claim 1, wherein monitoring the condition associated with the particular component or interaction between the two or more particular components comprises the step of:
polling a value for an Management Information Base object at the particular component or the particular two or more components;
wherein querying the state table is based at least upon the value for the Management Information Base object.

11. The method recited in claim 1, wherein the set of one or more illegal states or state transitions comprises a state associated with an authorization violation or an authentication forgery.

12. The method recited in claim 1, wherein the set of one or more undesirable states or state transitions comprises a state associated with a sudden quality of service degradation or a violation of a service level agreement.

13. The method recited in claim 1, further comprising the step of examining multiple notifications to deduce one or more trends regarding the network.

14. The method recited in claim 13, wherein the step of examining multiple notifications comprises examining notifications for stable-behavior in a threshold value for a particular trend.

15. The method recited in claim 13, wherein the step of examining multiple notifications comprises examining notifications for increases or decreases in a threshold value for a particular trend.

16. A computer-based system for capturing behavior for network components and for interactions between components, the system comprising:
one or more network components, each network component configured to spontaneously generate notifications when specified states and state transitions occur involving the network component,
wherein the specified state and state transitions include one or more composite state transitions, each of said composite state transition comprising multiple state transitions; and
a network management system configured to receive said spontaneously generated notifications;
wherein each network component is further configured to:
access first data that defines the specified states and state transitions involving the network component,
wherein the first data defines at least one composite state transition, each of said composite state transition comprising multiple state transitions;
access second data that indicates, for the network component or an interaction between the network component and another network component, a set of one or more undesirable states or state transitions;
wherein each of said one or more undesirable states or state transitions is a state or state transition of the specified states and state transitions that is associated with undesirable behavior; and
access third data that indicates, for the network component or the interaction, a set of one or more illegal states or state transitions;
wherein each of said one or more illegal states or state transitions is a state or state transition of the specified states and state transitions that is associated with illegal behavior;
wherein the set of one or more illegal states or state transitions is different from the set of one or more undesirable states or state transitions;
detect that a particular state or state transition has occurred at the network component or the interaction, wherein the step of detecting comprises:
monitoring a condition associated with the network component or the interaction;
querying a state table storing said first data to determine the particular state or state transition for the network component or the interaction;
determining, based on the second data and third data, that the particular state or state transition belongs to either the set of one or more undesirable states or state transitions or the set of one or more illegal states or state transitions;
in response to detecting that the particular state or state transition has occurred at the network component or interaction has entered, generating a notification corresponding to the particular state or state transition,
wherein the particular state or state transition is one of the one or more states and state transitions;
wherein the particular state or state transition belongs to either the set of one or more undesirable states or state transitions or the set of one or more illegal states or state transitions.

17. The system of claim 16, further comprising:
an agent configured to detect the generation of notifications by the network components, and configured to report detected notifications to said network management system.

18. The system of claim 16, wherein the state table is in the network management system.

19. The system of claim 16, wherein the state table is in one of the one or more network components.

20. A computer-based system for capturing illegal and undesirable behavior for network components and for interactions between components comprising:
one or more network components;
an agent configured to examine said network components to determine whether specified states or state transitions, including composite state transitions, have occurred,
wherein the agent is configured to generate notifications upon a determination that a specified state or state transition has occurred;
wherein the agent is configured to report detected notifications to a network management system;
said network management system configured to receive reports of said generated notifications;
wherein the agent is further configured to:
access first data that defines the specified states and state transitions involving a network component, wherein the first data defines at least one composite state transition, each of said composite state transition comprising multiple state transitions;

access second data that indicates, for the network component or an interaction between the network component and another network component, a set of one or more undesirable states or state transitions;

wherein each of said one or more undesirable states or state transitions is a state or state transition of the specified states and state transitions that is associated with undesirable behavior; and access third data that indicates, for the network component or the interaction, a set of one or more illegal states or state transitions;

wherein each of said one or more illegal states or state transitions is a state or state transition of the specified states and state transitions that is associated with illegal behavior;

wherein the set of one or more illegal states or state transitions is different from the set of one or more undesirable states or state transitions;

detect that a particular state or state transition has occurred at the network component or the interaction, wherein the step of detecting comprises:

monitoring a condition associated with the network component or the interaction;

querying a state table storing said first data to determine the particular state or state transition for the network component or the interaction;

determining, based on the second data and third data, that the particular state or state transition belongs to either the set of one or more undesirable states or state transitions or the set of one or more illegal states or state transitions;

in response to detecting that particular state or state transition has occurred at the network component or the interaction, generating one of said notifications, the one of said notifications corresponding to the particular state or state transition, wherein the particular state or state transition is one of the specified states and state transitions;

wherein the particular state or state transition belongs to either the set of one or more undesirable states or state transitions or the set of one or more illegal states or state transitions.

21. The method of claim 1, wherein the determined state transition is the particular state or state transition, and further wherein determining, based on the second data and third data, that the determined state belongs to either the set of one or more undesirable states or state transitions or the set of one or more illegal states or state transitions comprises:

based on the second data, determining whether or not the determined state belongs to the set of one or more undesirable states or state transitions.

22. The method of claim 1, wherein the determined state transition is the particular state or state transition, and further wherein determining, based on the second data and third data, that the determined state belongs to either the set of one or more undesirable states or state transitions or the set of one or more illegal states or state transitions comprises:

based on the third data, determining whether or not the determined state belongs to the set of one or more illegal states or state transitions.

23. The method of claim 1, wherein the state table further stores the second data and the third data.

24. A computer-readable storage medium carrying one or more sequences of instructions for capturing behavior for network components and for interactions between components, which instructions, when executed by one or more processors, cause the one or more processors to carry out the steps of:

accessing first data that defines one or more states and state transitions for a particular component or interaction between a particular two or more components, wherein the first data defines at least one composite state transition, each of said composite state transition comprising multiple state transitions;

accessing second data that indicates, for the particular component or interaction between the particular two or more components, a set of one or more undesirable states or state transitions;

wherein each of said one or more undesirable states or state transitions is a state or state transition of the one or more states and state transitions that is associated with undesirable behavior;

accessing third data that indicates, for the particular component or interaction between the particular two or more components, a set of one or more illegal states or state transitions;

wherein each of said one or more illegal states or state transitions is a state or state transition of the one or more states and state transitions that is associated with illegal behavior;

wherein the set of one or more illegal states or state transitions is different from the set of one or more undesirable states or state transitions; and in response to the particular component or interaction between the particular two or more components entering a particular state or state transition, generating a notification corresponding to the particular state or state transition, wherein the particular state or state transition is one of the one or more states and state transitions;

wherein the particular state or state transition belongs to either the set of one or more undesirable states or state transitions or the set of one or more illegal states or state transitions;

wherein the one or more sequences of instructions, when executed by one or more processors, further cause the one or more processors to carry out the step of:

detecting that the particular component or interaction between the particular two or more components has entered the particular state or state transition;

wherein said notification is generated in response to said step of detecting;

wherein the step of detecting comprises:

monitoring a condition associated with the particular component or interaction between the two or more particular components;

querying a state table storing said first data to determine a state for the particular component or interaction between the two or more particular components;

determining, based on the second data and third data, that the determined state belongs to either the set of one or more undesirable states or state transitions or the set of one or more illegal states or state transitions.

25. The computer-readable storage medium as recited in claim 24, wherein the one or more states are specified based on thresholds.

26. The computer-readable storage medium as recited in claim 24, wherein said notifications are events.

27. The computer-readable storage medium as recited in claim 24, wherein the particular component or interaction between the particular two or more components is a component, and wherein the step of generating the notification comprises generating the notification by the component.

28. The computer-readable storage medium as recited in claim 24, wherein the particular component or interaction between the particular two or more components is an interaction between the particular two or more components, and wherein the notification is generated by at least one of the particular two or more components.

29. The computer-readable storage medium as recited in claim 24, wherein the one or more sequences of instructions, when executed by one or more processors, further cause the one or more processors to carry out the step of:
reporting the notification to a network management system.

30. The computer-readable storage medium as recited in claim 24, wherein the step of detecting is performed by an agent, said agent being different than the particular component.

31. The computer-readable storage medium as recited in claim 24, wherein the one or more sequences of instructions, when executed by one or more processors, further cause the one or more processors to carry out the step of:
polling a value for an Management Information Base object at the particular component or the particular two or more components
wherein querying the state table is based at least upon the value for the Management Information Base object.

32. The computer-readable storage medium as recited in claim 24, wherein the set of one or more illegal states or state transitions comprises a state associated with an authorization violation or an authentication forgery.

33. The computer-readable storage medium as recited in claim 24, wherein the set of one or more undesirable states or state transitions comprises a state associated with a sudden quality of service degradation or a violation of a service level agreement.

34. The computer-readable storage medium as recited in claim 24, wherein the one or more sequences of instructions, when executed by one or more processors, further cause the one or more processors to carry out the step of examining multiple notifications to deduce one or more trends regarding the network.

35. The computer-readable storage medium as recited in claim 34, wherein the step of examining multiple notifications comprises examining notifications for stable-behavior in a threshold value for a particular trend.

36. The computer-readable storage medium as recited in claim 34, wherein the step of examining multiple notifications comprises examining notifications for increases or decreases in a threshold value for a particular trend.

37. The computer-readable storage medium as recited in claim 24, wherein the first data is stored in a state table in a network management system, wherein the step of generating is performed by a component or agent separate from the network management system.

38. The computer-readable storage medium as recited in claim 24, wherein the first data is stored in a state table in the particular component or in at least one of the two or more particular components.

39. The computer-readable storage medium as recited in claim 24, wherein determining, based on the second data and third data, that the determined state belongs to either the set of one or more undesirable states or state transitions or the set of one or more illegal states or state transitions comprises:
based on the second data, determining whether or not the determined state belongs to the set of one or more undesirable states or state transitions.

40. The computer-readable storage medium as recited in claim 24, wherein determining, based on the second data and third data, that the determined state belongs to either the set of one or more undesirable states or state transitions or the set of one or more illegal states or state transitions comprises:
based on the third data, determining whether or not the determined state belongs to the set of one or more illegal states or state transitions.

41. The computer-readable storage medium as recited in claim 24, wherein the state table further stores the second data and the third data.

42. A method for capturing behavior for network components and for interactions between components comprising:
accessing first data that defines one or more states and state transitions for a particular component or interaction between a particular two or more components,
wherein the first data defines at least one composite state transition, each of said composite state transition comprising multiple state transitions;
accessing second data that indicates, for the particular component or interaction between the particular two or more components, a set of one or more undesirable states or state transitions;
wherein each of said one or more undesirable states or state transitions is a state or state transition of the one or more states and state transitions that is associated with undesirable behavior;
accessing third data that indicates, for the particular component or interaction between the particular two or more components, a set of one or more illegal states or state transitions;
wherein each of said one or more illegal states or state transitions is a state or state transition of the one or more states and state transitions that is associated with illegal behavior;
wherein the set of one or more illegal states or state transitions is different from the set of one or more undesirable states or state transitions; and
in response to the particular component or interaction between the particular two or more components entering a particular state or state transition, generating a notification corresponding to the particular state or state transition,
wherein the particular state or state transition is one of the one or more states and state transitions;
wherein the particular state or state transition belongs to either the set of one or more undesirable states or state transitions or the set of one or more illegal states or state transitions;
the method further comprising:
detecting that the particular component or interaction between the particular two or more components has entered the particular state or state transition;
wherein said notification is generated in response to said step of detecting;
wherein the step of detecting comprises:
monitoring a condition associated with the particular component or interaction between the two or more particular components;
querying a state table storing said first data to determine a state transition for the particular component or interaction between the two or more particular components; and
determining, based on the second data and third data, that the determined state transition belongs to a particular set of one or more states or state transitions, the particular set of one or more states or state transitions being either the set of one or more undesirable states or state transitions or the set of one or more illegal states or state transitions.

43. The method recited in claim 42, wherein the determined state transition is a composite state transition, wherein the determined state transition is the particular state or state transition.

44. The method of claim 43, wherein:
the composite state transition comprises a first state transition and a second state transition; and
neither the first state transition nor the second state transition is in the particular set of one or more states or state transitions.

45. A computer-readable storage medium carrying one or more sequences of instructions for capturing behavior for network components and for interactions between components, which instructions, when executed by one or more processors, cause the one or more processors to carry out the steps of:
accessing first data that defines one or more states and state transitions for a particular component or interaction between a particular two or more components,
wherein the first data defines at least one composite state transition, each of said composite state transition comprising multiple state transitions;
accessing second data that indicates, for the particular component or interaction between the particular two or more components, a set of one or more undesirable states or state transitions;
wherein each of said one or more undesirable states or state transitions is a state or state transition of the one or more states and state transitions that is associated with undesirable behavior;
accessing third data that indicates, for the particular component or interaction between the particular two or more components, a set of one or more illegal states or state transitions;
wherein each of said one or more illegal states or state transitions is a state or state transition of the one or more states and state transitions that is associated with illegal behavior;
wherein the set of one or more illegal states or state transitions is different from the set of one or more undesirable states or state transitions; and
in response to the particular component or interaction between the particular two or more components entering a particular state or state transition, generating a notification corresponding to the particular state or state transition,
wherein the particular state or state transition is one of the one or more states and state transitions;
wherein the particular state or state transition belongs to either the set of one or more undesirable states or state transitions or the set of one or more illegal states or state transitions;
wherein the one or more sequences of instructions, when executed by one or more processors, further cause the one or more processors to carry out the step of:
detecting that the particular component or interaction between the particular two or more components has entered the particular state or state transition;
wherein said notification is generated in response to said step of detecting;
wherein the step of detecting comprises:
monitoring a condition associated with the particular component or interaction between the two or more particular components;
querying a state table storing said first data to determine a state transition for the particular component or interaction between the two or more particular components; and
determining, based on the second data and third data, that the determined state transition belongs to a particular set of one or more states or state transitions, the particular set of one or more states or state transitions being either the set of one or more undesirable states or state transitions or the set of one or more illegal states or state transitions.

46. The method recited in claim 45, wherein the determined state transition is a composite state transition, wherein the determined state transition is the particular state or state transition.

47. The method of claim 46, wherein:
the composite state transition comprises a first state transition and a second state transition; and
neither the first state transition nor the second state transition belong to the particular set of one or more states or state transitions.

* * * * *